United States Patent [19]

Evans

[11] 4,000,633
[45] Jan. 4, 1977

[54] LOCKING GAS CAP WITH TORQUE OVERRIDE FEATURE

[75] Inventor: John H. Evans, Connersville, Ind.

[73] Assignee: Stant Manufacturing Company, Inc., Connersville, Ind.

[22] Filed: Sept. 8, 1975

[21] Appl. No.: 611,219

[52] U.S. Cl. .............................. 70/165; 220/203; 220/210; 220/303

[51] Int. Cl.² .................. B65D 51/16; B65D 55/14

[58] Field of Search ............. 70/165; 220/203, 303, 220/288, 210

[56] References Cited

UNITED STATES PATENTS

| | | | |
|---|---|---|---|
| 1,701,816 | 2/1929 | Malluk et al. | 70/165 |
| 2,070,692 | 2/1937 | Stone | 70/165 |
| 2,135,351 | 11/1938 | Nehls | 70/165 |
| 2,138,871 | 12/1938 | Mallak | 70/165 |
| 2,467,087 | 4/1949 | Korchan | 70/165 |
| 3,757,987 | 9/1973 | Marshall | 220/303 |
| 3,820,680 | 6/1974 | Friend | 220/203 |
| 3,907,155 | 9/1975 | Smith et al. | 220/210 |

Primary Examiner—George E. Lowrance
Assistant Examiner—Allan N. Shoap
Attorney, Agent, or Firm—Jenkins, Hanley & Coffey

[57] ABSTRACT

A locking gas cap for a threaded filler neck having a sealing lip extending peripherally about its axis, the cap comprising a closure member threaded to engage and close the filler neck, a gasket on the closure member for engaging and sealing against the lip, an outer shell providing a hand grip secured to the closure member for rotation thereon, a key-operated lock and at least one locking member movable by the lock connected to the shell for rotation therewith. A race is disposed for rotation in the shell, and a driving connection is provided between the race and the closure member which is torque limited in the direction which advances the closure member on the filler neck and positive in the opposite direction, the locking member being movable into and out of engagement with the race selectively to provide a driving connection between the shell and the race. The preferred embodiment includes a frictional driving connection between the race and the shell in the direction which advances the closure member on the filler neck even when the locking member is out of engagement with the race.

17 Claims, 5 Drawing Figures

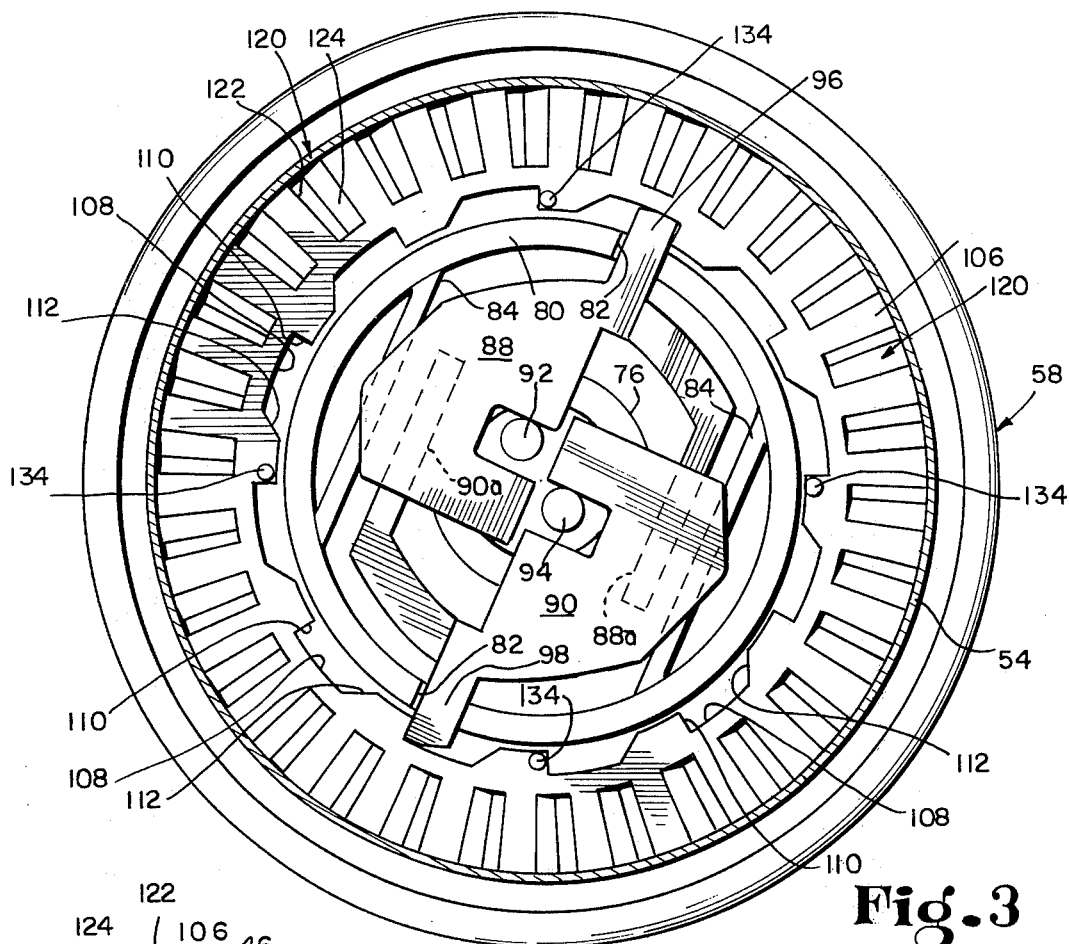
Fig. 3
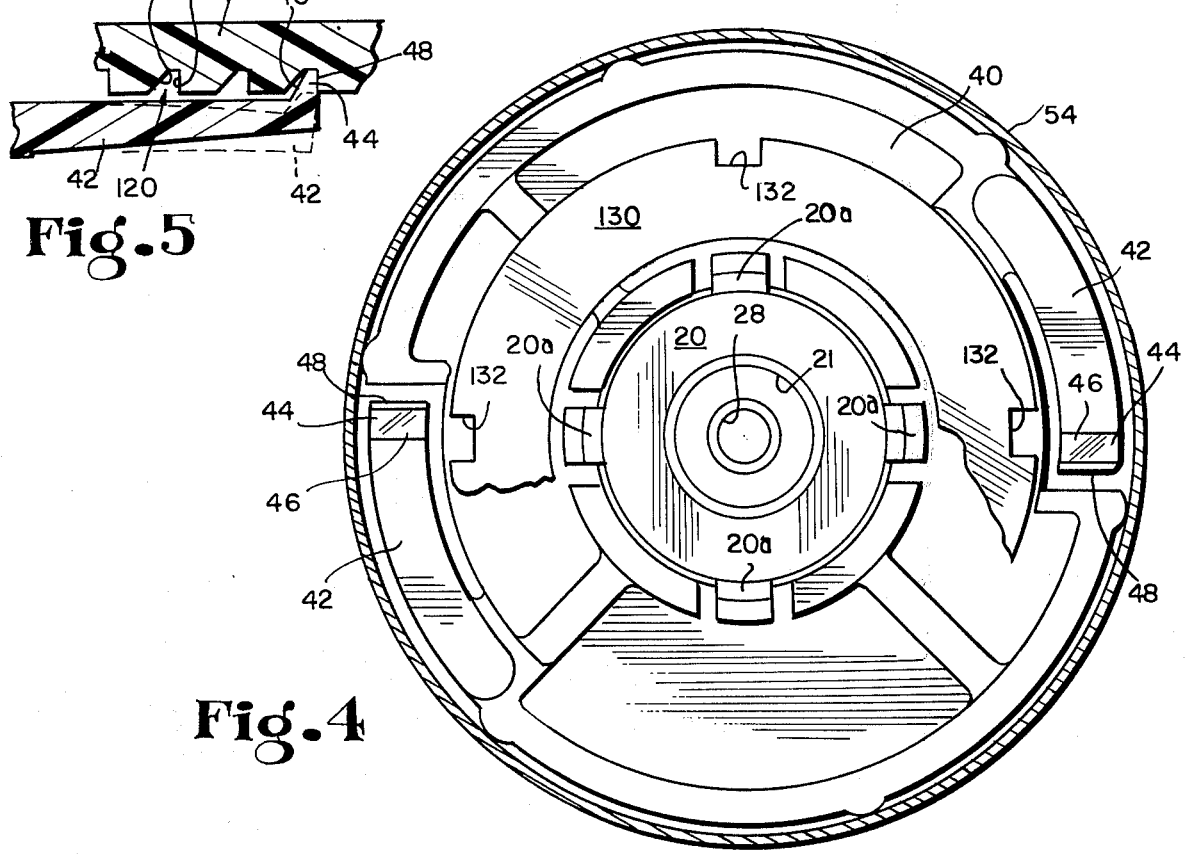
Fig. 5
Fig. 4

LOCKING GAS CAP WITH TORQUE OVERRIDE FEATURE

The present invention relates to caps for vehicle fuel tanks, and more particularly to the provision of a threaded cap for a threaded filler neck, which cap is provided with a key lock to protect the contents of the fuel tank as well as a torque-override feature to protect the sealing gasket of the cap and to prevent the cap from being threaded too tightly onto the filler neck. Locking gas caps are, of course, very old in the art. Most locking gas caps, however, are designed to work with filler necks which have peripherally extending cam-lock surfaces rather than filler necks which are threaded. Such conventional locking gas caps include a cylinder lock mechanism for moving a locking member radially into engagement with the cam lock surface to prevent unauthorized removal of the cap.

The prior art also includes showings of locking caps, not necessarily fuel caps, comprising a threaded closure member and an outer shell with key-lock means for selectively providing a driving connection between the outer shell and the closure member. In such devices, until the key is actuated, the outer shell will simply rotate on the closure member and not disengage the closure member from its closing position. See, for instance, U.S. Pat. Nos. 2,101,758; 2,070,692; and 2,467,087. The present invention involves a considerable improvement over such threaded locking caps of the prior art. First of all, the present invention incorporates a torque-override feature which prevents the closure member of the cap from being twisted too tightly on the filler neck, thereby damaging the threads or the gasket which provides a seal between the filler neck and the closure member. The torque-override feature also prevents tightening the cap so tight it is difficult to remove. Further, the cap of the present invention includes a frictional driving arrangement between the outer shell and the closure member to permit the cap to be tightened on the filler neck even when the key is withdrawn from the lock to break the lock-provided driving connection between the outer shell and the closure member.

While the prior art does have showings of gas caps with torque-override features, for instance as shown in the Dawson Friend U.S. Pat. No. 3,820,680, the present invention constitutes a significant improvement because of the manner in which the torque-override feature is incorporated with the locking feature. Particularly, in the cap of the present invention, a race is provided in the outer shell for rotation about the coinciding axes of the outer shell and closure member, this race serving as an important part of the locking feature as well as an important part of the torque-override feature.

An object of the present invention, therefore, is to provide a locking gas cap in which the improvement comprises a race disposed for rotation in the outer shell which provides the hand grip, means for drivingly connecting the race and the closure member for rotation together about the coinciding axes of the cap and filler neck, the connecting means being torque-limited in the direction which advances the closure member on the filler neck and positive in the opposite direction, the outer shell also carrying locking means including a locking member shiftable into and out of engagement with the race selectively to provide a driving connection between the shell and the race. Another object is to provide such a cap further including means for providing a frictional driving connection between the race and the shell in the direction which advances the closure member on the filler neck even when the said locking member is out of engagement with the race. This will permit withdrawal of the key from the cylinder lock and retraction of the locking member which engages the race and still permit a filling station attendant to tighten the cap back on the filler neck.

Other objects and features of the present invention will become apparent as this description progresses.

In the drawings:

FIG. 3 is a view similar to FIG. 2 only showing the locking members in their radially outer positions engaging the race;

FIG. 4 is a sectional view taken along the line 4—4 in FIG. 1; and

FIG. 5 is an enlarged fragmentary sectional view taken from FIG. 1 generally along the line 5—5.

Figure 1:
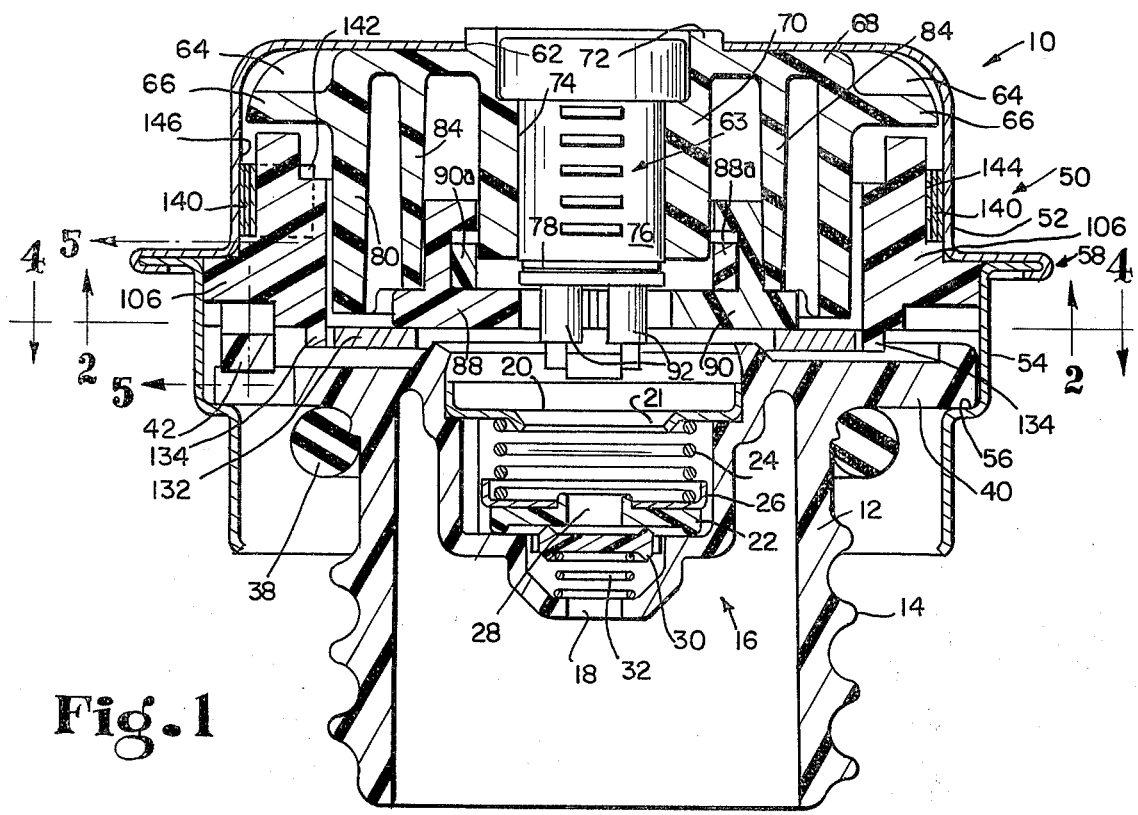
FIG. 1 is a sectional view of the cap of the present invention.

Referring now particularly to the drawings, it will be seen that the cap 10 comprises a molded plastic closure member 12 having an axially inwardly extending shank threaded as indicated at 14 and providing a pressure-vacuum valve assembly 16 for controlling venting of the fuel tank through an opening 18, the valve assembly including a valve cover plate 20 having an opening 21 centrally located therein and being secured in place by staked over portions 20a (FIG. 4). The valve assembly further includes a pressure valve 22 urged to its closing position by means of a spring 24 and spring plate 26, the pressure valve having a central opening 28 therein normally closed by a vacuum valve member 30 urged to its closing position by a spring 32. Such a valve assembly 16 is now well known in the art and is merely illustrative in this disclosure. In order to assure that venting occurs through the valve assembly 16, the closure member 12 carries a sealing ring 38 about its shank portion and against its upper, peripherally and radially outwardly extending flange 40. The illustrative flange 40 is provided with a pair of diametrically opposed, peripherally extending drive fingers or pawls 42 having distal end portions 44. The fingers 42 are integrally formed on the closure member resiliently tp be urged upwardly. Each finger 42 distal end portion 44 has as best viewed in FIG. 5 an inclined wall 46 and an abrupt wall 48.

The cap 10 also comprises an outer shell 50 secured to the closure member 12 for rotation on the closure member about the axis of the cap 10. The illustrative outer shell 50 is formed by an upper shell member 52 and lower shell member 54 which provides an axially outwardly facing, radially inwardly extending flange surface 56 for engaging the bottom side of the flange 40, the parts 52,54 being joined together as indicated at 58. The outer shell 50 is provided with a concentric opening 62 to accommodate the cylinder lock assembly indicated generally at 63 and four, peripherally spaced apart, radially outer pockets 64 for receiving, respectively, radially outwardly extending tabs 66 formed on the lock assembly 63 housing 68, only two such pockets 64 and tabs 66 being shown. The engagement of the tabs 66 in the pocket 64 secures the lock assembly 63 in the outer shell 50 for rotation therewith relative to the closure member 12. The illustrative housing 68 is primarily a cylindrically formed housing providing a concentric, inner cylindrical shell 70 having an upper portion 72 received in the opening 62 and defining an internal cylindrical opening 74 for receiving a conventional cylinder 76 which is secured against axial movement upwardly out of the opening 74 by a locking ring 78.

Figure 2:
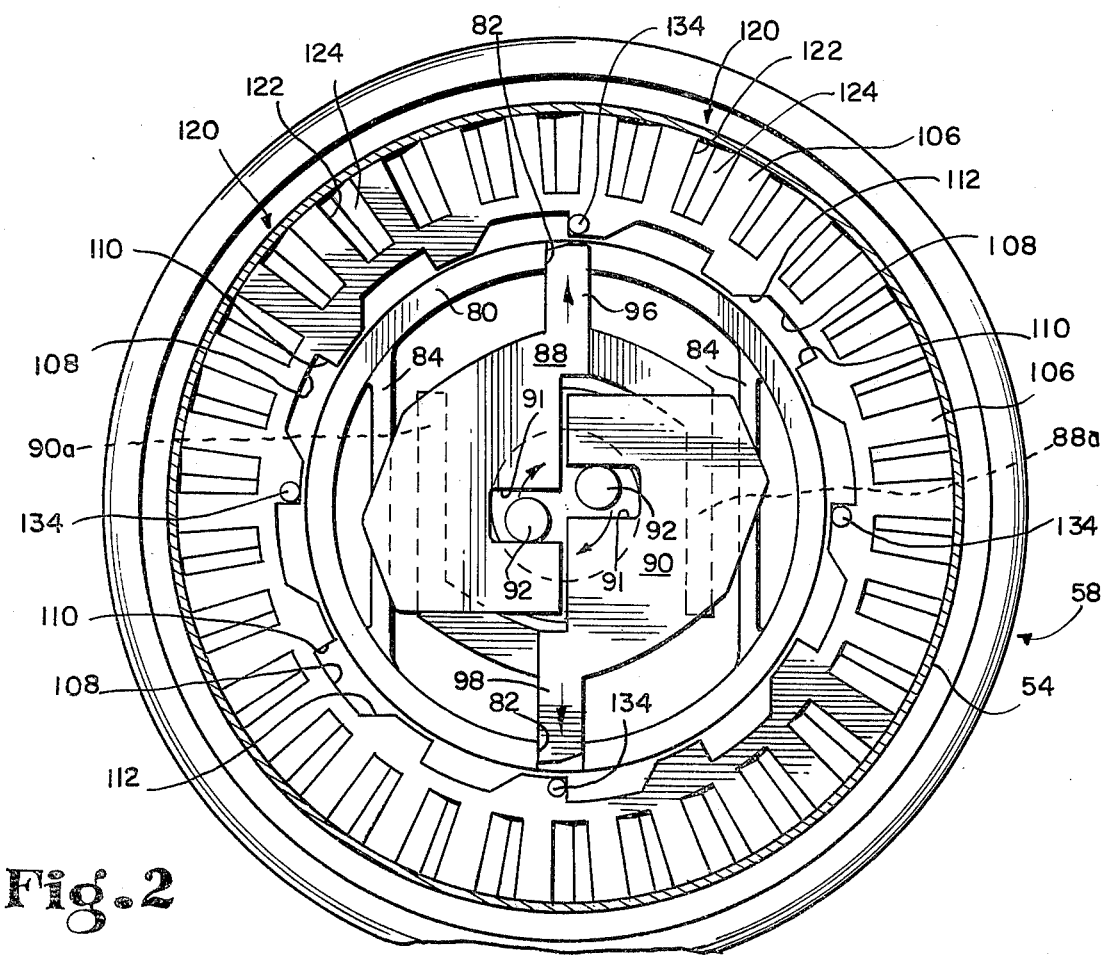
FIG. 2 is a sectional view taken from FIG. 1 generally along the line 2—2.

The housing 68 is also illustratively formed to have an outer annular depending wall 80 formed to provide, at its distal (lower) edge, radially outwardly extending slots 82 which serve as guide means for locking members to be described hereinafter. The housing is also illustratively formed with transversely extending guide walls 84 for such locking members, these walls being best seen in FIGS. 2 and 3.

The illustrative locking members 88,90 are formed to have interlocking portions 88a,99a and slots 91 for receiving the axially extending drive pins 92 provided by the cylinder 76. When the cylinder is rotated clockwise as viewed in FIG. 2, the pins 92 engage the slots 91 to drive the locking members 88,90 radially outwardly or to their radially outer positions shown in FIG. 3, each locking member having a locking bolt or locking portion 96,98 guided for movement radially through the slots 82 in the wall 80.

The cap 10 comprises also a race 106 which is illustratively an annular member disposed in the outer shell 50 for rotation relative thereto about the cap axis. The race 106 provides a plurality of peripherally spaced apart, radially inwardly facing notches 108 having peripherally spaced apart walls 110,112, the wall 110 being an abrupt wall and the wall 112 being an inclined wall as illustrated. The locking portions or bolts 96,98 engage into these notches 108 as best seen in FIG. 3. With the locking members 88,90 in the positions shown in FIG. 3, rotation of the outer shell 50 and, consequently, the locking members 88,90 will rotate the race 106 with the outer shell. The inclined walls 112 aid in directing bolts 96,98 into notches 108.

The race 106 is also formed to provide a plurality of peripherally spaced apart, downwardly facing pockets 120 having peripherally spaced apart, radially extending faces or walls 122,124, the wall 122 being abrupt and the wall 124 being inclined as best seen in FIG. 5. The distal end portions 44 of the fingers 42 engage into these pockets 120. Looking at FIG. 5, when the race 106 is moved to the right which corresponds to clockwise movement of the cap 10, looking down at the cap on the filler neck of the vehicle, the inclined wall 124 will act against the incline 46 of the finger 42 to move the finger downwardly out of engagement with the race 106. This provides the torque override feature of the cap 10 which prevents the cap from being tightened so that the threads 14 or the sealing ring 38 will not be damaged. The pockets 120, of course, cooperate with the fingers 42 much in the same manner as a ratchet and pawl arrangement. When it is desired to remove the cap, assuming that the race 106 is drivingly connected to the outer shell 50 by actuation of the locking members 88,90, the abrupt wall 122 of a pocket 120 will engage the abrupt wall 48 of a drive finger 42 to move the closure member counterclockwise threadedly to disengage the filler neck. The driving connection, therefore, between the race 106 and closure member 12 is torque-limited in the direction which advances the threaded engagement of the cap on the filler neck and positive in the opposite direction to permit removal of the cap when the cylinder lock is actuated drivingly to connect the outer shell 50 to the race 106.

Often, an automobile owner will desire to use his key to project the locking members 88,90 radially outwardly so that the cap 10 can be removed from the filler neck. Then, while the cap 10 is off the filler neck and, for instance, the tank is being filled, the key may be removed from the cylinder 76 leaving the locking members 88,90 in a retracted position or radially inner position. It is necessary conventionally to move the drive pins 92,94 back to their starting position in order to remove the key from the cylinder 76. In such a case, the outer shell 50 is drivingly connected to the race 106 by frictional driving means. The illustrative frictional driving means includes a spring steel band 140 having its proximal end 142 bent radially inwardly and, therefore, connected to the race 106 and its distal end free. The spring 140 is wrapped about an outer diameter 144 of the race 106 radially to expand outwardly to engage a concentric internal wall 146 of the outer shell 50. The spring band 140 extends from this proximal end 142 counterclockwise about the wall 144. Thus, when the outer shell 50 is rotated in the clockwise direction, the spring band tends to expand to engage the shell wall 146 to provide a functional driving connection which is sufficient to move the race 106 to drive the closure member 12 onto the filler neck. In fact, the driving torque of the spring band 140 is greater than the torque at which the fingers 42 will be cammed out of engagement with the pockets 120. Additionally, inclined walls 112 of notches 108 serve to cam bolts 96,98 radially inwardly out of notches 108 when the outer shell 50 is rotated for advancing closure member 14 into the filler neck to close the fuel tank. This protects the lock mechanism and leaves the driving to the spring band 140.

I claim:

1. A locking gas cap for a threaded filler neck having an axis and a sealing lip extending peripherally about said axis, said cap comprising a closure member threaded to engage and close said filler neck, gasket means on said closure member for engaging and sealing against said lip, an outer shell providing a hand grip secured to said closure member for rotation thereon about said axis, a key-operated lock and at least one locking member moved by said lock, said lock and locking member being connected to said shell for rotation therewith, in which the improvement comprises a race disposed for rotation in said shell, means for drivingly connecting said race and said closure member for rotation together about said axis, said connecting means being torque limited in the direction which advances said closure member on said filler neck to protect said gasket means against overtightening and positive in the opposite direction to permit removal of said cap from said filler neck, said locking member being movable into and out of engagement with said race selectively to provide a driving connection between said shell and said race.

2. The improvement of claim 1 further including means for providing a frictional driving connection between said race and said shell in the direction which advances said closure member on said filler neck even when said locking member is out of engagement with said race.

3. The improvement of claim 2 in which said shell is formed to have a concentric internal wall and said race is annularly formed to have an external wall concentric with and spaced radially inwardly from said internal wall, said frictional connection means being disposed between said internal and external walls.

4. The improvement of claim 3 in which said frictional connection means includes a spring band coiled coaxially about said internal wall to expand radially outwardly into engagement with said external wall, said band being connected to said race for movement therewith.

5. The improvement of claim 2 in which said frictional connection means includes a spring band having a proximal end connected to said race and a free distal end, said band being coiled about said race to expand radially outwardly to engage said shell, said band extending from said proximal end connection about said race in the said opposite direction so that rotation of said shell relative to said race in the direction which advances said cap on said filler neck will radially expand said band into tighter engagement with said shell.

6. The improvement of claim 1 in which said means for drivingly connecting said race and said closure member includes at least one drive finger provided by said closure member, said race being formed to have a plurality of peripherally spaced apart pockets, said finger having a distal end portion engageable with said pockets, said finger being resiliently disposed yieldably to urge said distal end portion into engagement with said pockets, each of said pockets having an abrupt leading wall for engaging and driving said finger end portion when said shell is turned in said opposite direction and an inclined following wall for engaging and driving said finger end portion when said shell is turned in the first said direction which advances said cap on said filler neck.

7. The improvement of claim 1 in which said race is an annular member and said means for drivingly connecting said race and said closure member includes at least one resilient finger provided by one of said members, the other of said members providing a plurality of peripherally spaced apart pockets for engaging said finger.

8. The improvement of claim 7 further including means for providing a frictional driving connection between said race and said shell in the direction which advances said closure member on said filler neck even when said locking member is out of engagement with said race.

9. The improvement of claim 8 in which said shell is formed to have a concentric internal wall and said race is annularly formed to have an external wall concentric with and spaced radially inwardly from said internal wall, said frictional connection means being disposed between said internal and external walls.

10. The improvement of claim 8 in which said frictional connection means includes a spring band having a proximal end connected to said race and a free distal end, said band being coiled about said race to expand radially outwardly to engage said shell, said band extending from said proximal end connection about said race in the said opposite direction so that rotation of said shell relative to said race in the direction which advances said cap on said filler neck will radially expand said band into tighter engagement with said shell.

11. A locking cap for threaded filler necks of vehicle fuel tanks, said cap comprising a closure member threaded to engage and close said filler neck, said closure member having a thread axis coinciding with the axis of said filler neck, an outer shell providing a hand grip secured to said closure member for rotation thereon about said axis, and means for locking said cap on said filler neck, in which the improvement comprises a race disposed for rotation in said shell about said axis, means for drivingly connecting said race and said closure member for rotation together about said axis, said locking means including a locking member carried by said shell for rotation therewith, said locking member being shiftable into and out of engagement with said race to provide a selective driving connection between said shell and race, and means for providing a frictional driving connection between said race and said shell in the direction which advances said closure member on said filler neck even when said locking member is out of engagement with said race.

12. The improvement of claim 11 in which said means for drivingly connecting said race and said closure member is torque limited for advancing said closure member on said filler neck and positive in the opposite direction to permit removal of said cap from said filler neck.

13. The improvement of claim 12 in which said race is an annular member and said means for drivingly connecting said race and said closure member includes at least one resilient finger provided by one of said members, the other of said members providing a plurality of peripherally spaced apart pockets for engaging said finger.

14. The improvement of claim 12 in which said locking means includes a cylinder lock concentric with the axis of said cap and extending axially into said shell, said locking means including a pair of said locking members and means for guiding said locking members for movement by said cylinder lock between radially inner and radially outer positions, said race being an annular member having a plurality of peripherally spaced apart, radially inwardly opening notches for receivably engaging said locking members in their said outer positions.

15. A locking cap for a fuel tank having a threaded filler neck, said cap comprising an outer shell, a lock assembly, a lock assembly housing disposed within said outer shell and fixed against rotation relative thereto, said lock assembly including a lock and at least one locking bolt, said lock being operatively connected to said bolt for radially projecting and retracting said bolt from an annular space defined between said shell and said lock assembly housing, an annular race disposed within said space and having a first set of peripherally spaced apart, radially inwardly facing engaging means for drivingly engaging said locking bolt for rotating said race with said outer shell when said lock is in a cap removal position, said race further having a second set of peripherally spaced apart, axially inwardly facing engaging means, a closure member providing a threaded axially inner portion for engaging the threads on said filler neck, said outer shell and closure member being connected together for relative rotation, said closure member having means for drivingly engaging said second set of engaging means to provide a torque limited driving connection in the direction which advances said closure member into said neck and a positive driving connection in the opposite direction.

16. A locking gas cap for a fuel tank having a threaded filler neck, said cap comprising an outer shell, a lock assembly, a lock assembly housing disposed within said outer shell and fixed against rotation relative thereto, said lock assembly including a lock and at least one locking bolt, said lock being operatively connected to said bolt for radially projecting and retracting said bolt from an annular space defined between said shell and said lock assembly housing, an annular race disposed within said space and having a set of peripherally spaced apart, radially inwardly facing first engaging means for drivingly engaging said locking bolt for rotating said race with said outer shell when said lock is in a cap removal position, a closure member providing a threaded axially inner portion for engaging the threads of said filler neck, said outer shell and closure member being connected together for relative rotation, said race and closure member being connected for rotation together, and second engaging means for providing a driving connection between said race and said shell in the direction which advances said closure member into said neck even when said first engaging means are not drivingly engaged by said locking bolt.

17. The improvement of claim 16 in which said second engaging means includes means providing a frictional driving connection between said race and said shell.

* * * * *

PO-1050
(5/69)

UNITED STATES PATENT OFFICE
CERTIFICATE OF CORRECTION

Patent No. 4,000,633          Dated January 4, 1977

Inventor(s)  John H. Evans

It is certified that error appears in the above-identified patent and that said Letters Patent are hereby corrected as shown below:

Column 2, line 48, "tp" should be -- to --;
Column 3, line 18, "99a" should be -- 90a --;
Column 4, line 49, after "in" insert -- and relative to --;
Column 6, line 48, after "race" insert -- rotatable with respect to said shell and --.

Signed and Sealed this

Twelfth Day of April 1977

[SEAL]

Attest:

RUTH C. MASON
Attesting Officer

C. MARSHALL DANN
Commissioner of Patents and Trademarks